(12) United States Patent
Steinbach et al.

(10) Patent No.: US 9,398,428 B2
(45) Date of Patent: Jul. 19, 2016

(54) ENTERPRISE MESSAGING CLIENT AND MESSAGING ARCHIVE

(71) Applicant: Verizon Patent and Licensing Inc., Arlington, VA (US)

(72) Inventors: Lodema M. Steinbach, Clayton, CA (US); Ian Lynn, San Leandro, CA (US); Zhijian Lin, Dublin, CA (US); Keith P. Lampron, Lebanon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 21 days.

(21) Appl. No.: 14/469,283

(22) Filed: Aug. 26, 2014

(65) Prior Publication Data

US 2016/0066164 A1    Mar. 3, 2016

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 4/12* | (2009.01) | |
| *H04W 12/06* | (2009.01) | |

(52) U.S. Cl.
CPC ............... *H04W 4/12* (2013.01); *H04W 12/06* (2013.01)

(58) Field of Classification Search
CPC .............................. H04W 4/12; H04W 12/06
USPC ............... 455/411, 466, 412.1, 412.2, 414.2
See application file for complete search history.

(56) References Cited

U.S. PATENT DOCUMENTS

| | | | | |
|---|---|---|---|---|
| 7,050,792 B2 * | 5/2006 | Chou | .................. | H04L 29/06 455/412.1 |
| 7,281,012 B2 * | 10/2007 | Galchev | .................. | G06F 9/4401 |
| 7,346,150 B2 * | 3/2008 | Frifeldt | ............... | H04L 12/5835 379/88.12 |
| 8,600,416 B2 * | 12/2013 | Lin | ........................ | H04L 12/585 455/3.06 |
| 8,639,245 B2 * | 1/2014 | Shi | ........................ | H04W 8/205 455/419 |
| 8,752,127 B2 * | 6/2014 | Musfeldt | ............... | H04L 9/3234 713/168 |
| 9,008,628 B2 * | 4/2015 | Lichorowic | ........... | H04M 1/271 455/412.2 |
| 9,060,253 B2 * | 6/2015 | Cooper | .................... | H04W 4/12 |
| 9,226,122 B2 * | 12/2015 | Steinbach | ............... | H04W 4/14 |
| 9,277,378 B2 * | 3/2016 | Jackson | .................. | H04W 4/14 |
| 2009/0156181 A1 * | 6/2009 | Athsani | .................. | H04L 12/58 455/414.2 |
| 2014/0059142 A1 * | 2/2014 | Gandhi | .................... | H04W 4/12 709/206 |
| 2014/0244765 A1 * | 8/2014 | Smith | .................... | H04L 51/24 709/206 |

OTHER PUBLICATIONS

AT&T, "AT&T Global Smart Messaging Suite for Healthcare," May 3, 2012, 3 pages.

(Continued)

*Primary Examiner* — Marceau Milord

(57) ABSTRACT

A messaging device receives configuration information from a configuration device. The messaging device identifies application configuration information, associated with a first user device, based on the configuration information and sends the application configuration information to the first user device for configuring a messaging application on the first user device. The messaging device receives an incoming message, including message information, from the messaging application on the first user device. The messaging device identifies, based on the message information and the configuration information, a second user device and a message format associated with the second user device. The messaging device sends, in the message format associated with the second user device, an outgoing message, based on the message information and the configuration information, to the second user device.

20 Claims, 15 Drawing Sheets

(56) References Cited

OTHER PUBLICATIONS

MobileGuard, "Deviceguard: Mobile Device Management," 1 page, Jun. 27, 2014 (Print date).
MobileGuard, "Messageguard: for IPhone," 1 page, Jun. 27, 2014 (Print date).
MobileGuard, "Messageguard: SMS Capture for Mobile Devices," 2 pages, Jun. 27, 2014 (Print date).
MobileGuard, "Safechat: for IPhone," 1 page, Jun. 27, 2014 (Print date).
MobileGuard, "Voiceguard: Record & Archive Mobile Calls for Regulatory Compliance," 1 page, Jun. 27, 2014 (Print date).

* cited by examiner

ENTERPRISE MESSAGING CLIENT AND MESSAGING ARCHIVE

BACKGROUND

Mobile devices, such as a smart phones, are often used by enterprise-users to send messages on behalf of their enterprise(s). Enterprise-users may send messages using a native messaging application operating using a personally owned mobile device or a separate enterprise-issued mobile device.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may use the user device to send messages to or from an enterprise. If a user sends messages using a personal user device, the user may comingle personal and enterprise-related messages or send enterprise-related messages in violation of various rules or regulations. A user may also send messages using a separate enterprise-issued user device. However, using a separate device may inconvenience the user and increase costs for the enterprise. Using both personal and enterprise-issued devices may also create difficulty for archiving messages. Implementations described herein may assist a user in messaging to or from an enterprise, while assisting the enterprise in archiving those messages sent to or from the enterprise by the user.

Figure 1:
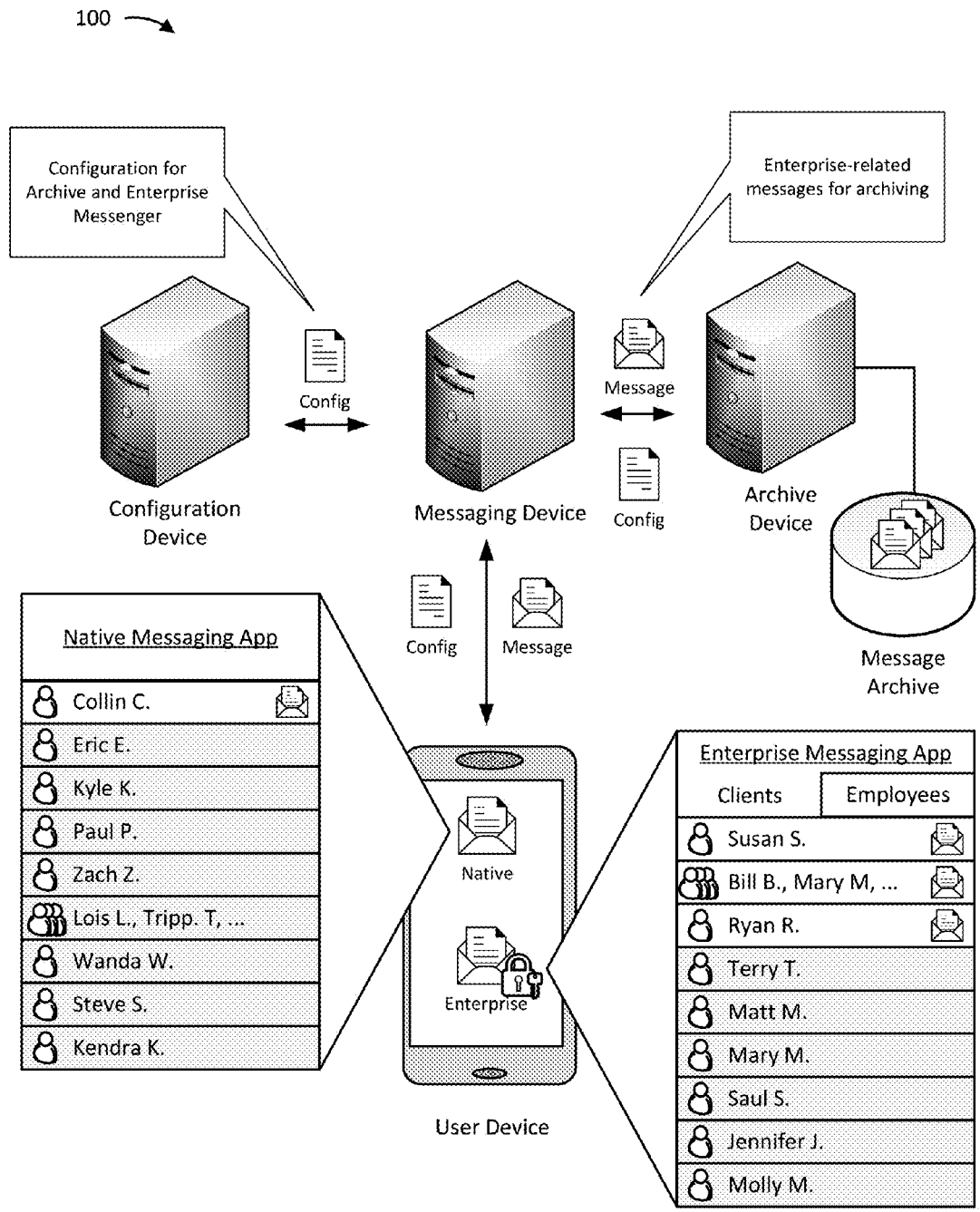
FIG. 1 is a diagram of an overview of an example implementation described herein.

FIG. 1 is a diagram of an overview of an example implementation 100 described herein. As shown in FIG. 1, example implementation 100 may include a user device, such as a smart phone, a configuration device, a messaging device, and an archive device.

The user device may include a native messaging application capable of sending and receiving messages using, e.g., a short message service (SMS) or multimedia message service (MMS). The native messaging application may use configuration information, contact list information, a conversation history, etc., stored on the user device. The user device may also include an enterprise messaging application capable of sending and receiving messages using, e.g., packets. The enterprise messaging application may use separate configuration information, contact list information, etc., obtained from a configuration device (e.g., via the messaging device), after the user has provided proper authentication credentials.

As also shown in FIG. 1, the messaging device may receive messages from the user device as, e.g., SMS, MMS, or a packet message. The messaging device may also send messages to the user device as, e.g., SMS, MMS, or a packet message. The messaging device may, based on configuration information received from the configuration device, copy messages associated with an enterprise to an archive device. The archive device, based on configuration information obtained from the configuration device (e.g., via the messaging device), may store and provide access to enterprise message history.

In this way, a messaging device may allow an enterprise to centrally manage and archive messages, associated with the enterprise, sent to and from a user device, using an enterprise messaging application and/or a native messaging application. The messaging device may further facilitate a mixed enterprise/native messaging application environment by converting a packet message, sent from a sending user device using an enterprise messaging application, to a SMS/MMS message, for delivery to a receiving user device using a native messaging application.

Figure 2:
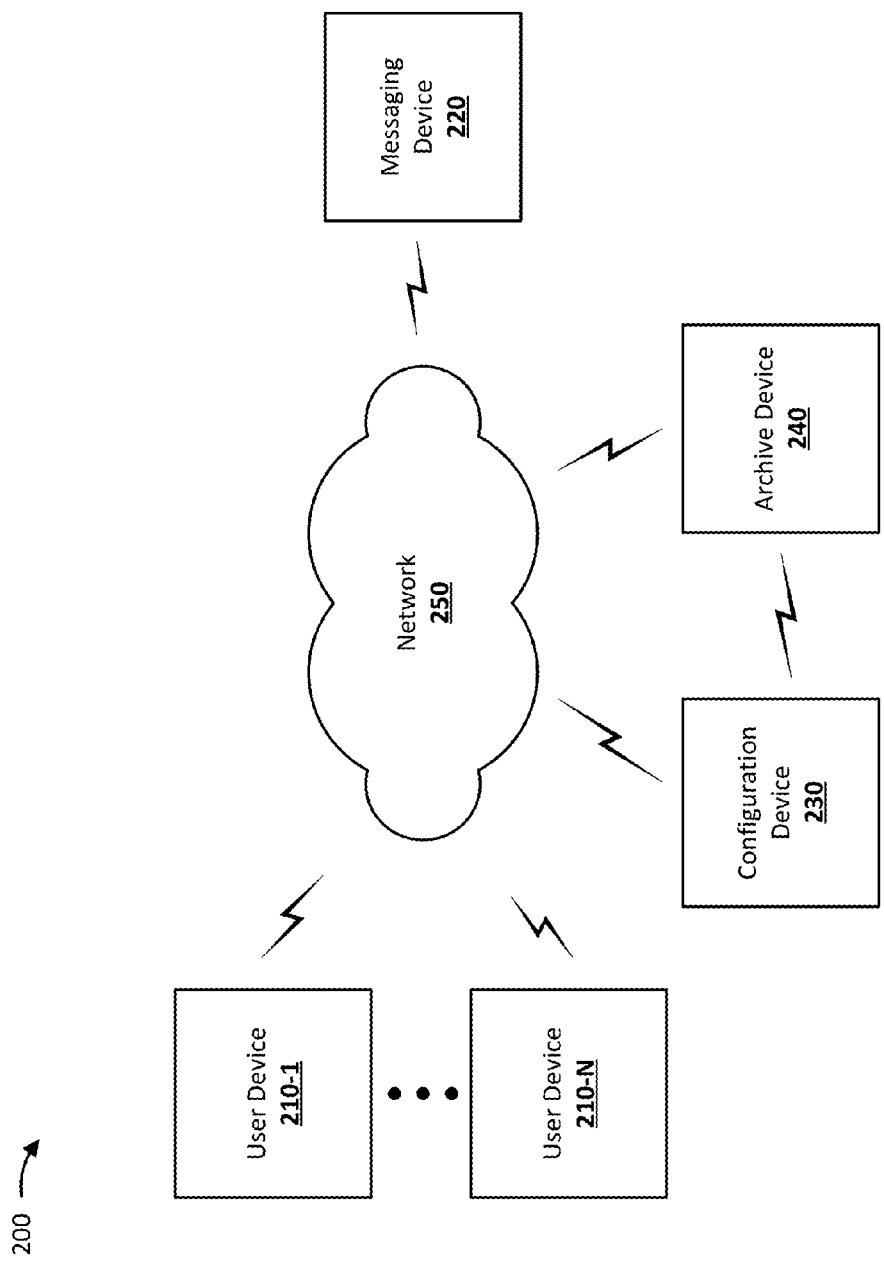
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210-1, . . . , 210-N (N≥1) (hereinafter referred to collectively as "user devices 210" and individually as "user device 210"); a messaging device 220; a configuration device 230; an archive device 240; and a network 250.

User device 210 may include a device capable of receiving, generating, storing, processing, and/or providing information. For example, user device 210 may include a communications and/or computing device, such as a mobile phone (e.g., a smart phone, a radiotelephone, etc.), a laptop computer, a tablet computer, a personal computer, a handheld computer, a gaming device, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a landline telephone, or another type of computation or communication device. In some implementations, user device 210 may receive information from and/or transmit information to another device in environment 200 via network 250. For example, user device 210 may store and execute a native messaging application and/or an enterprise messaging application capable of sending and/or receiving messages via, e.g., messaging device 220. The enterprise messaging application, executed on user device 210, may request and receive configuration information from, e.g., configuration device 230 (directly or via, e.g., messaging device 220). The enterprise messaging application may also request and receive message history from, e.g., archive device 240 (directly or via, e.g., messaging device 220).

Messaging device 220 may include one or more devices capable of storing, processing, and/or routing information. For example, messaging device 220 may include a server device or a similar type of device. In some implementations, messaging device 220 may include a communication interface that allows messaging device 220 to receive information from and/or transmit information to other devices in environment 200. In some implementations, messaging device 220 may send, receive, and/or store messages associated with, e.g., user device 210, configuration device 230, and/or archive device 240. In some implementations, messaging device 220 may validate, store, and/or modify messages based on configuration information received from, e.g., configuration device 230.

Configuration device 230 may include one or more devices capable of storing, processing, and/or routing messages and/or configuration information. For example, configuration device 230 may include a server device or a similar type of device. In some implementations, configuration device 230 may include a communication interface that allows configuration device 230 to receive information from and/or transmit information to other devices in environment 200. In some implementations, configuration device 230 may send, receive, and/or store configuration information used to configure, e.g., user device 210, messaging device 220, and/or archive device 240.

Archive device 240 may include one or more devices capable of storing, processing, and/or routing messages and/or configuration information. For example, archive device 240 may include a server device or a similar type of device. In some implementations, archive device 240 may include a communication interface that allows archive device 240 to receive information from and/or transmit information to other devices in environment 200. In some implementations, archive device 240 may send, receive, and/or store messages associated with, e.g., user device 210, messaging device 220, and/or configuration device 230.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network. In some implementations, network 250 may be used to transfer, e.g., messages and/or configuration information between, e.g., user device 210, messaging device 220, configuration device 230, and/or archive device 240.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
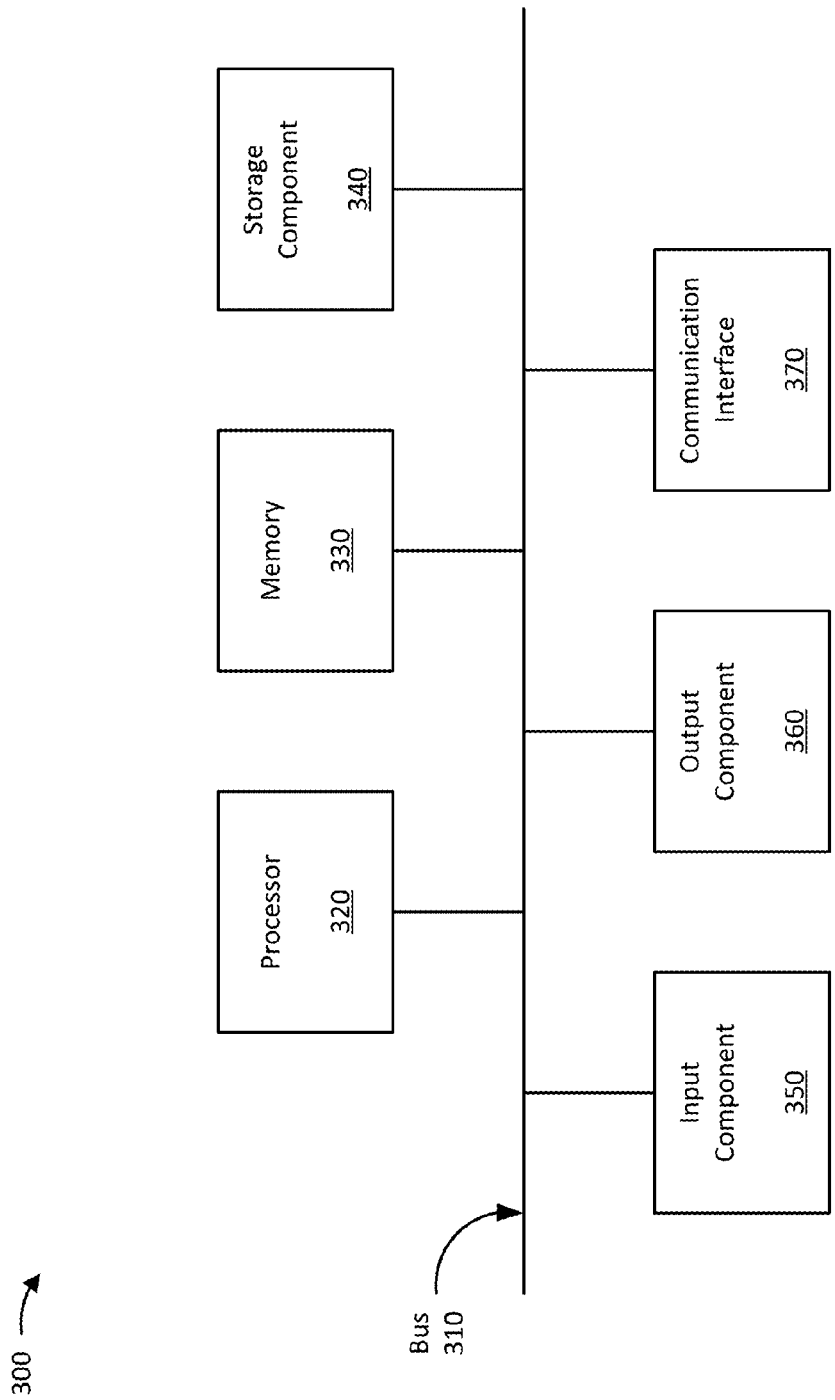
FIG. 3 is a diagram of example components of one or more of the devices of FIG. 2.

FIG. 3 is a diagram of example components of a device 300. Device 300 may correspond to user device 210, messaging device 220, configuration device 230, and/or archive device 240. In some implementations, user device 210, messaging device 220, configuration device 230, and/or archive device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
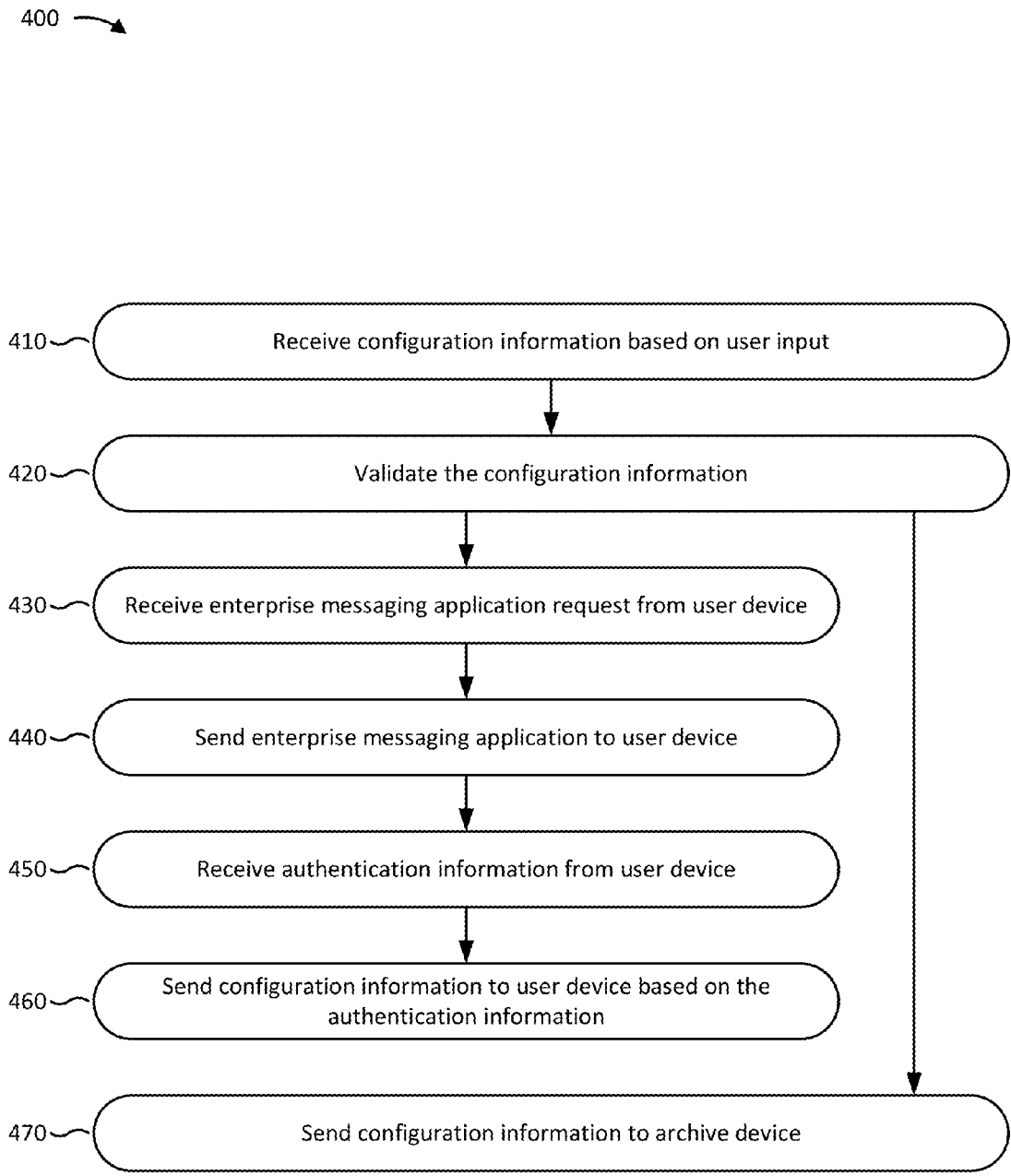
FIG. 4 is a flowchart of an example process for setting up an enterprise messaging and archive system.

FIG. 4 is a flowchart of an example process 400 for setting up an enterprise messaging and archive system. In some implementations, one or more process blocks of FIG. 4 may be performed by messaging device 220. Additionally, or alternatively, one or more process blocks of FIG. 4 may be performed by another device or a group of devices separate from or including messaging device 220, such as user device 210, configuration device 230, and/or archive device 240.

As shown in FIG. 4, process 400 may include receiving configuration information based on user input (block 410). For example, a user may log into, e.g., configuration device 230, to provide input via, e.g., an enterprise portal and/or enterprise messaging application. The messaging device 220 may receive configuration information, based on the user input from, e.g., configuration device 230. The configuration information may include any information which may be used to configure user device 210, messaging device 220, configuration device 230, and/or archive device 240.

For example, the configuration information may include look and feel configuration information to configure the aesthetic of, e.g., an enterprise messaging application and/or enterprise portal accessed via, e.g., user device 210 and/or configuration device 230.

Alternatively, or additionally, the configuration information may include users and groups configuration information to configure, e.g., a user device 210, messaging device 220, configuration device 230, and/or archive device 240. Users and groups configuration information may further include privilege information which may identify actions which a particular user or group may or may not perform. Privilege information may include e.g., restrictions on sending or receiving messages, modifying configuration information, or accessing archived messages.

Alternatively, or additionally, the configuration information may include directory configuration information to configure, e.g., a contacts directory within an enterprise messaging application accessed via, e.g., user device 210. Alternatively, or additionally, the directory configuration information may be received from and/or synchronized with, e.g., an enterprise's existing customer relationship management (CRM) device which maintains enterprise user information, enterprise messages, enterprise contact information, and/or other enterprise-related information.

Alternatively, or additionally, the configuration information may include archive configuration information to configure, e.g., messaging device 220 to flag messages for archival and send archive-flagged messages to, e.g., an archive device 240. Archive configuration information may also include information for configuring, e.g., an archive device 240 to provide storage and access to messages archived by messaging device 220.

As also shown in FIG. 4, process 400 may include validating the configuration information (block 420). Messaging device 220 may validate the identity of a user and/or device sending the configuration information. For example, messaging device 220 may determine, based on user credentials received with the configuration information, that the user has sufficient privileges to send the configuration information (e.g., some policies may require "supervisor" or "administrator" credentials). As another example, messaging device 220 may determine that the configuration information is signed with a digital security certificate from a trusted authority. Alternatively, or additionally, messaging device 220 may validate whether a user or user device 210 is associated with an enterprise by, e.g., consulting records of ownership and/or consent (e.g., to determine that a phone number to be archived belongs to an enterprise requesting archival).

As also shown in FIG. 4, process 400 may include receiving an enterprise messaging application request from a user device (block 430). For example, messaging device 220 may receive, from user device 210, a request to send an enterprise messaging application. Messaging device 220 may receive an enterprise messaging application request to initialize a user device 210 to, e.g., store the application for subsequent use without a subsequent request. Alternatively, or additionally, messaging device 220 may receive a request each time a user wishes to execute the enterprise messaging application using a user device 210.

As also shown in FIG. 4, process 400 may include sending the enterprise messaging application to the user device (block 440). For example, messaging device 220 may send, to user device 210, the enterprise messaging application based on the enterprise messaging application request received from user device 210. Alternatively, or additionally, messaging device 220 may send the enterprise messaging application to user device 210 without first receiving an enterprise messaging application request from user device 210 (e.g., when an enterprise wishes to "push" an update or installation of the enterprise messaging application onto user device 210). Alternatively, or additionally, another device, e.g., configuration device 240, may send the enterprise messaging application to user device 210, and/or user device 210 may be pre-loaded with the enterprise messaging application.

As also shown in FIG. 4, process 400 may include receiving authentication information from the user device (block 450). For example, when running the enterprise messaging application on user device 210, a user of user device 210 may be prompted to input authentication information. Alternatively, or additionally, the enterprise messaging application on user device 210 may send authentication information already stored on user device 210. The authentication information may include user credentials (e.g., a username, password, phone number, e-mail address, and/or personal identification code) which correspond to credentials contained within the configuration information. Based on a correspondence between the received user credentials and the credentials contained within the configuration information, messaging device 220 may identify a user and determine the configuration information and message information associated with that user and/or user device 210 (e.g., contact list information, messages to be sent to the identified user, etc.). The authentication information, sent by user device 210 to messaging device 220, may expire, based on conditions set in the configuration information, prompting a user of user device 210 to re-authenticate.

As also shown in FIG. 4, process 400 may include sending configuration information to the user device based on the authentication information (block 460). For example, messaging device 220 may send, to user device 210, some or all of the configuration information associated with user device 210 and/or a user of user device 210, based on the authentication information received by messaging device 220. Alternatively, or additionally, one or more other devices (e.g., configuration device 230, archive device 240, or another device) may send configuration information to user device 210. The configuration information, sent by messaging device 220 to user device 210, may expire, based on conditions set in the configuration information, prompting a user of user device 210 to re-authenticate and/or messaging device 220 to re-send the configuration information.

The configuration information, sent to user device 210, may include, e.g., look and feel configuration information and/or directory configuration information for configuring the enterprise messaging application running on user device 210. User device 210 may keep the configuration information, received from messaging device 220, separate from other configuration information stored on user device 210. For example, an enterprise messaging application, running on user device 210, may use the look and feel configuration information and/or directory configuration information received from messaging device 220, while a native messaging application, running on user device 210, may use separate look and feel configuration information and/or directory configuration information. In this way, a user of user device 210 may separate personal and enterprise-related messaging.

The configuration information, sent to user device 210, may also include a virtual phone number, associated with user device 210 and/or a user of user device 210, for facilitating messaging device 220's conversion of messages between SMS/MMS format and packet message format. In this way, a user of the enterprise messaging application may send, using the enterprise messaging application, a packet message. Messaging device 220 may convert the packet message into an SMS/MMS sent from the virtual phone number. A user of a native messaging application may likewise send an SMS/MMS message to a virtual phone number, and messaging device 220 may convert the SMS/MMS, using the virtual phone number, to a packet message for delivery to a user of the enterprise messaging application.

As also shown in FIG. 4, process 400 may include sending configuration information to an archive device (block 470). For example, messaging device 220 may send, to archive device 240, some or all of the configuration information received from configuration device 230. Alternatively, or additionally, one or more other devices (e.g., user device 210, configuration device 230, or another device) may send configuration information to archive device 240. The configuration information, sent to a archive device 240, may include archive configuration information for archiving messages sent and/or received by messaging device 220. The archive configuration information may include archiving policies, such as how, where, and how long messages are to be archived. For example, the archive configuration information may include authentication information and/or users and groups configuration information for permitting or denying access to archived messages, as well as information for transferring archived messages from archive device 240 to one or more other devices (e.g., user device 210, messaging device 220, configuration device 230, or another device, such as another archive device 250). Sending configuration information to archive device 240 may involve authentication with archive device 240 in a manner similar to that described with respect to block 420.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation relating to the example process of FIG. 4. In example implementation 500, assume that a user wishes to configure an enterprise messaging application and messaging archive. Assume further that the user inputs configuration information, e.g., via an enterprise portal, to a user device 210 for configuring the enterprise messaging application and messaging archive.

As shown in FIG. 5A-5F, example implementation 500 may include an enterprise portal having various options for using and configuring an enterprise messaging application and message archive system. For example, the portal may include options for viewing message activity, sending a new message, and/or viewing saved draft messages. The portal may also include options for viewing, adding, and/or modifying contacts and contact lists e.g., employees, customers, vendors, etc.). The portal may also include options for generating and/or viewing reports, such as message traffic, tracking, and response time. The portal may also include options for viewing and/or modifying configuration information, such as look and feel, users and groups, directory information, and archive configuration. The portal may also include options for obtaining help. The portal may be part of or integrated into an enterprise messaging application. Alternatively, or additionally, the portal may be separate from the enterprise messaging application. For example, the portal may be an interface to configuration device 230 and/or messaging device 220.

Figure 5A:
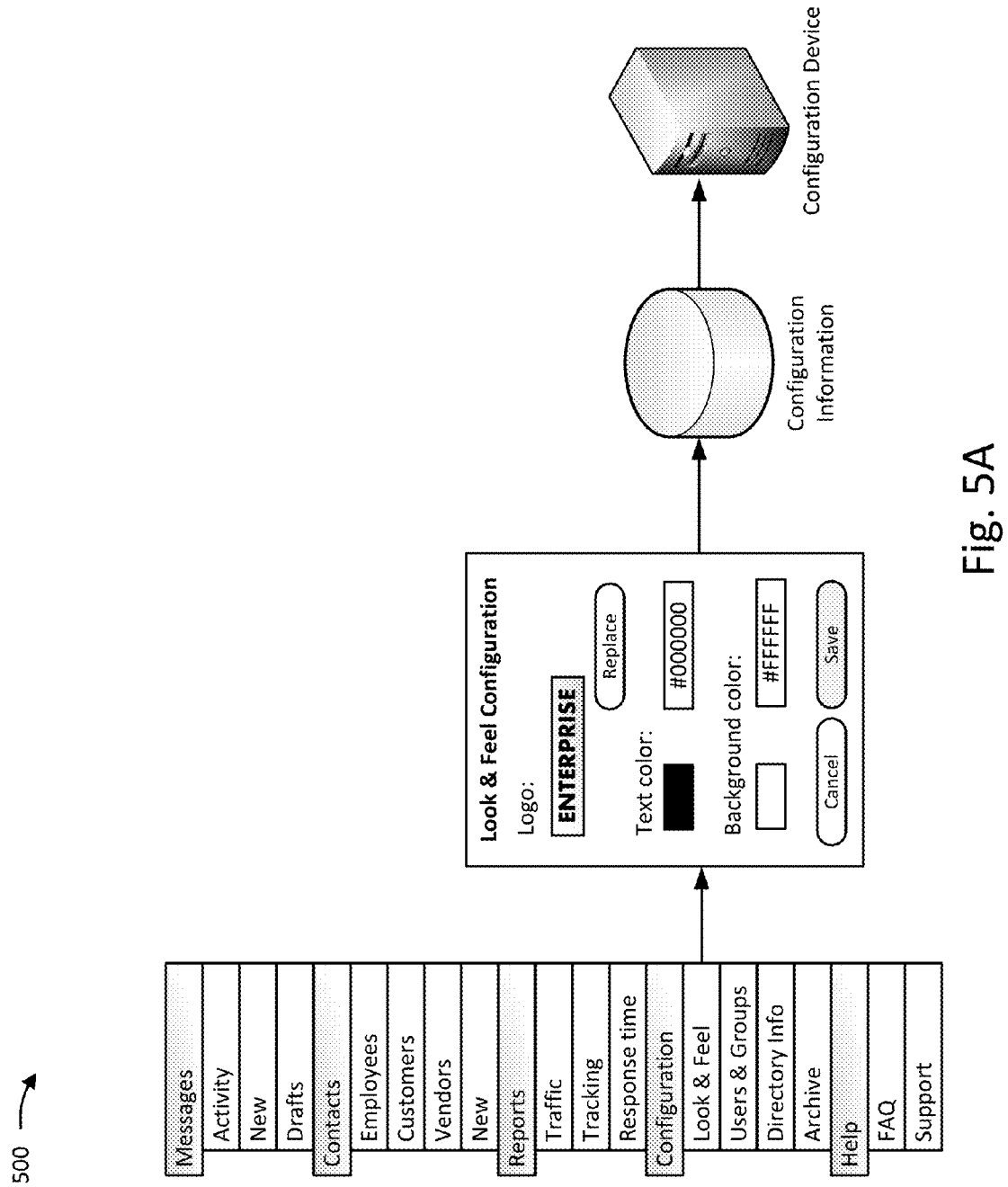
FIGS. 5A-5F are diagrams of an example implementation relating to the example process of FIG. 4.

As shown in FIG. 5A, assume, for example implementation 500, that the user provides input that includes look and feel configuration information for an enterprise messaging application. Look and feel configuration information may include one or more images, colors, layouts, etc. for configuring an enterprise messaging application and/or enterprise portal. For example, a user may input (via, e.g., user device 210) an enterprise logo, a text color, and a background color. Configuration device 230 may then receive and store configuration information, based on the look and feel configuration information.

Figure 5B:
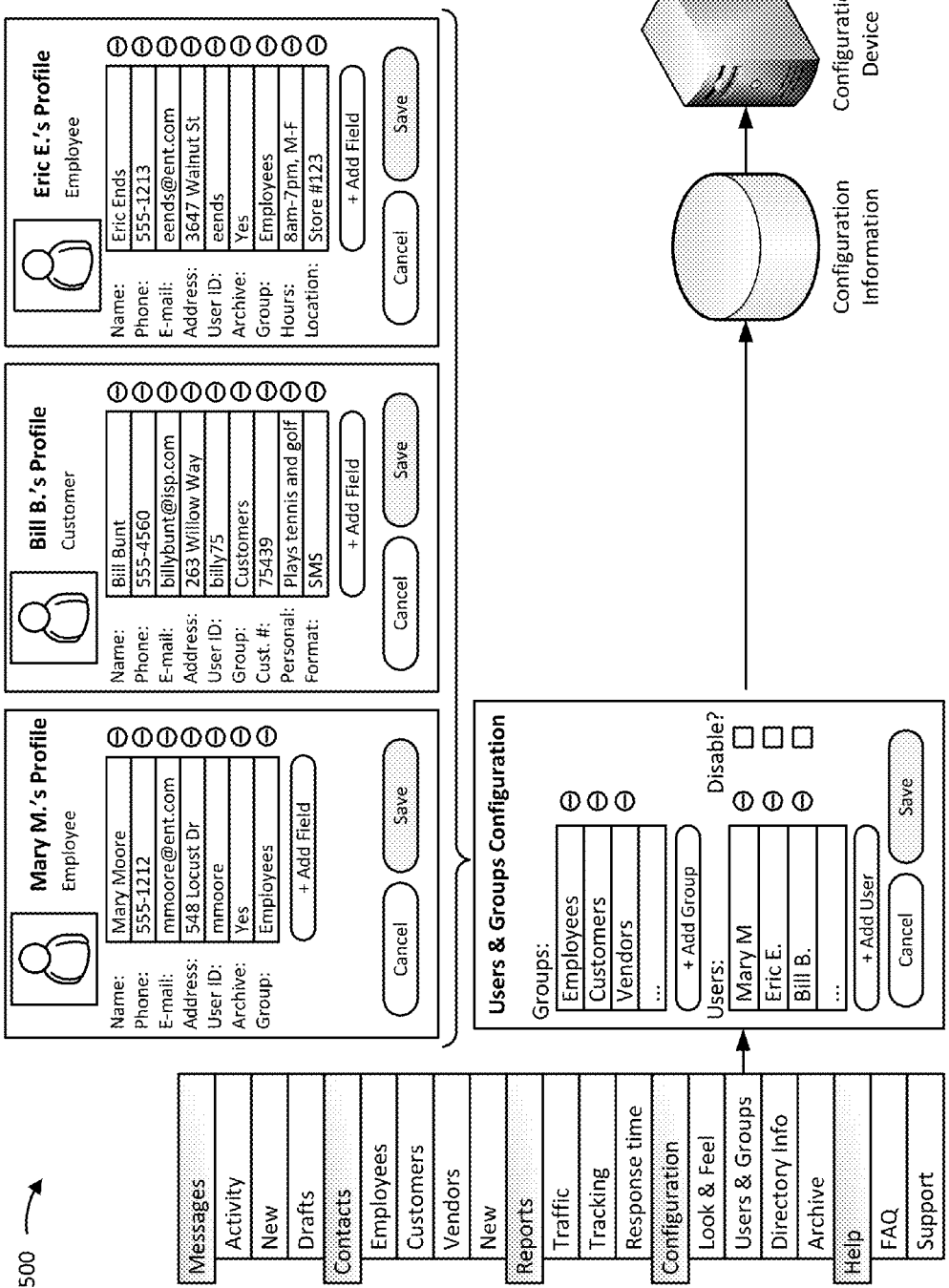

As shown in FIG. 5B, assume, for example implementation 500, that the user provides input that includes users and groups configuration information. Users and groups configuration information may identify one or more users and, associated with the one or more users, one or more groups, user/group credentials, and/or user profiles. A user profile may include various information about a user including, e.g., a name, image, phone number, e-mail address, physical address, personal preference, etc. The user profile may also include enterprise-related information associated with the user including, e.g., a username, password, group, personal identification number, privilege information, etc. The user profile may also include messaging-related information associated with the user including, e.g., a messaging format (e.g., SMS, MMS and/or packet message), delivery options, archive flag (e.g., designation that the user's messages are to be archived), messaging restriction (e.g., conditions limiting the user's sending and/or receiving of messages), etc.

A messaging restriction may include a condition for limiting a user's sending or receiving of messages, including, e.g., a time-based condition (e.g., time of day, day of week, etc.); location-based condition (e.g., state, city, area/postal code, building, etc.); content condition (e.g., confidential, sensitive, job-related, containing keyword(s), etc.); security condition (e.g., use of encryption, user privilege, etc.); or the like. The users and groups configuration may also provide an option for disabling a user account to, e.g., disable and/or erase the information stored by an enterprise messaging application on the user device 210, associated with the disabled user account.

For example, a user may input (via, e.g., user device 210) profiles for three users: Mary M., Bill B., and Eric E. Of these three users, Mary M. and Eric E. are employees of an enterprise, and Bill B. is a customer. Bill B.'s profile may indicate personal information, e.g., that he plays tennis and golf, which may be information relevant to the enterprise. Bill B.'s profile may also indicate that he prefers to receive communications via SMS. Eric E.'s profile may indicate that his ability to send and receive enterprise messages is restricted to 8 AM to 7 PM, Monday through Friday, within enterprise location #123, Configuration device 230 may then receive and store configuration information, based on the users and groups configuration information.

Figure 5C:
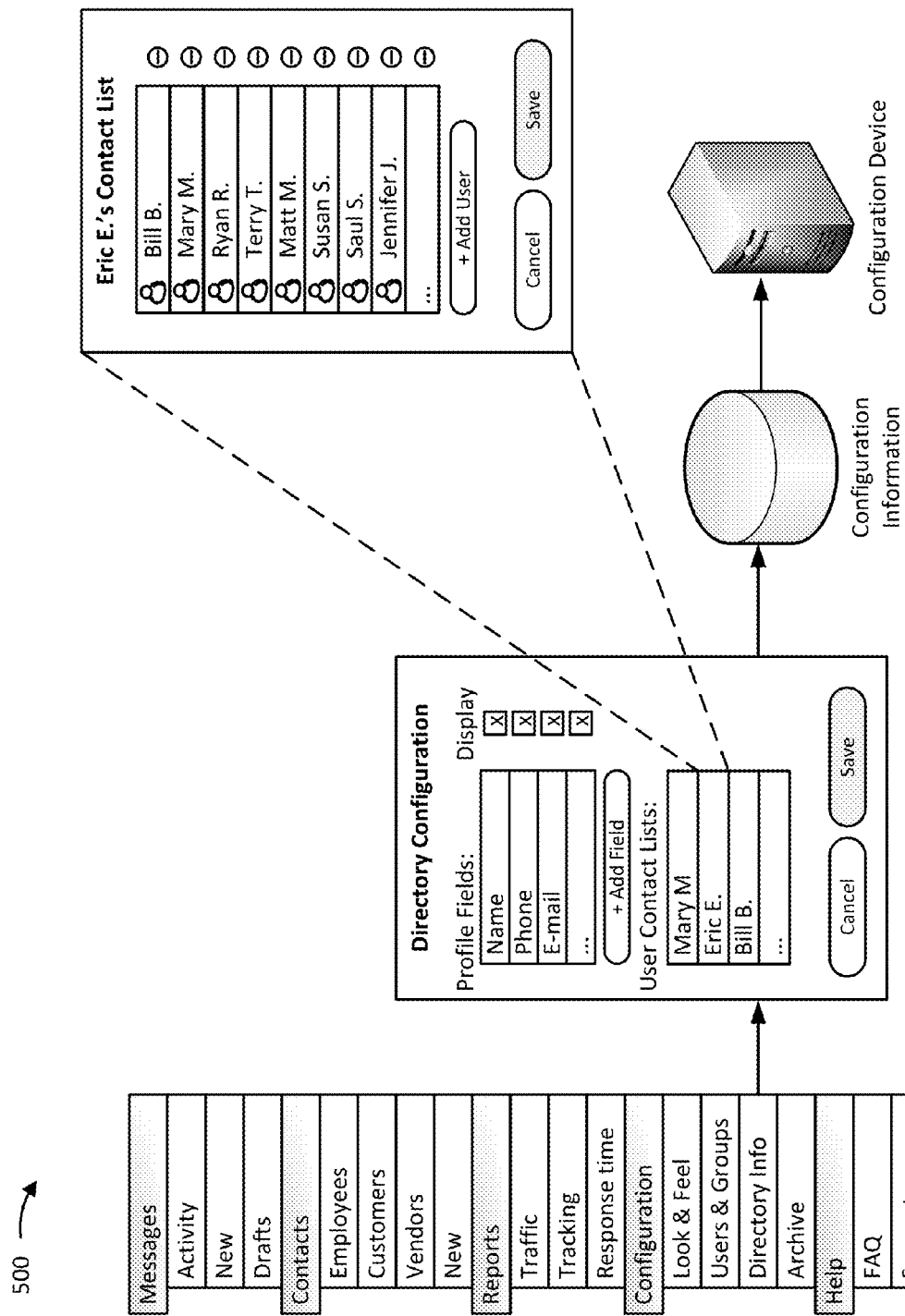

As shown in FIG. 5C, assume, for example implementation 500, that the user provides input that includes directory configuration information. Directory configuration information may include a list of fields which may be used to form a user profile. Directory configuration information may also include contact lists for each user. Profile fields may identify a user's name, phone number, e-mail address, etc. (see, e.g., FIG. 5B). For example, a user may input (via, e.g., user device 210) a contact list for Eric E. which identifies Bill B., Mary M., etc. Configuration device 230 may then receive and store configuration information, based on the directory configuration information.

Figure 5D:
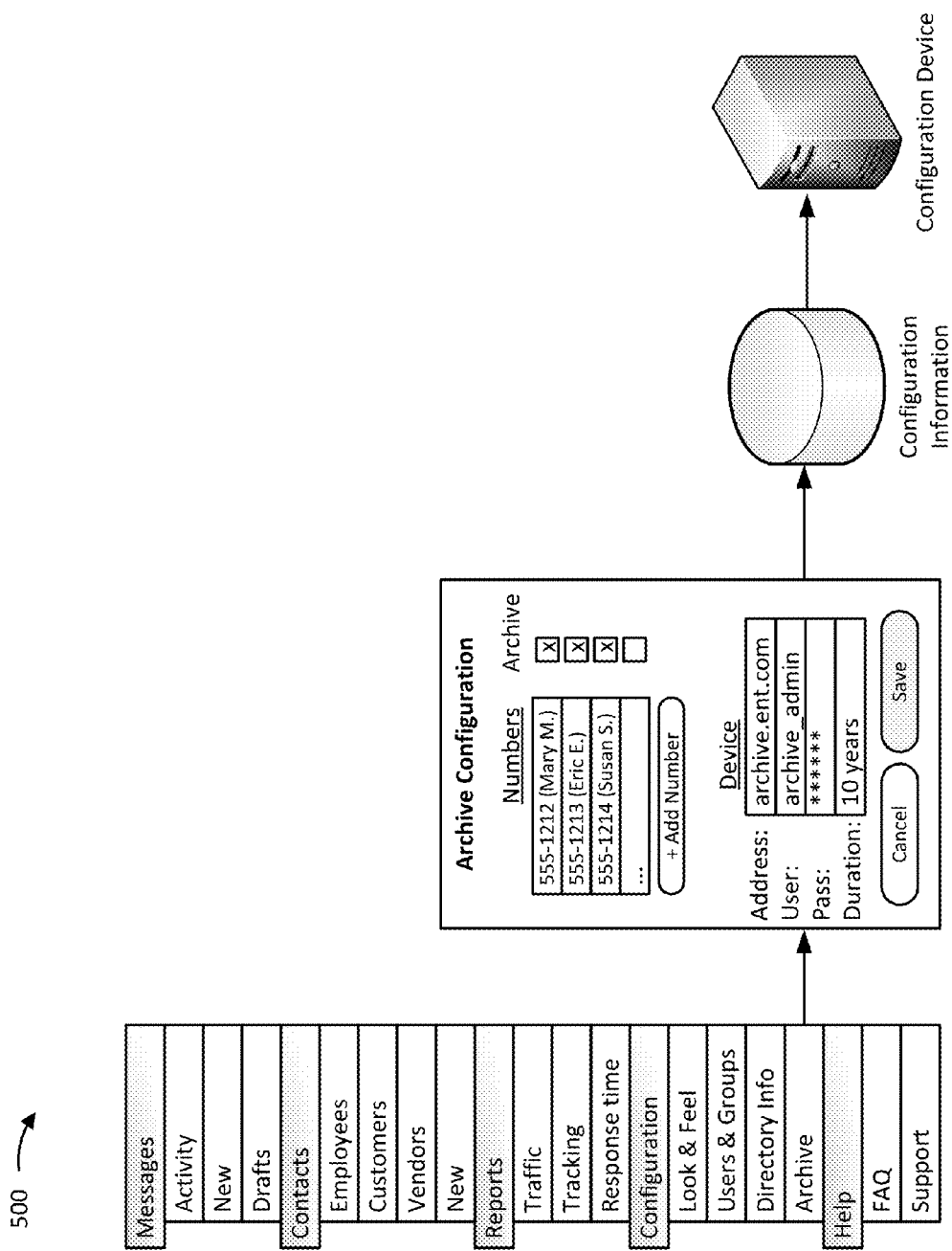

As shown in FIG. 5D, assume, for example implementation 500, that the user provides input that includes archive configuration information. Archive configuration information may include user identifiers (e.g., phone numbers), owned or operated by the enterprise, and an archive flag. Archive configuration information may also include an address, credentials, and settings for an archive device 240. For example, a user may input (via, e.g., user device 210) the phone numbers associated with Mary (555-1212), Eric (555-1213), etc. and set the archive flag for those numbers. The user may also enter, e.g., a location, username, and password for archive device 240. The user may further enter a duration indicating how long archive device 240 should store messages (e.g., for 10 years). The archive configuration information may take the form of a document (e.g., a list of comma-separated values (CSV) or an extended markup language (XML) document) or may take the form of a profile field (e.g., an archive flag for a user and/or phone number associated with the enterprise). Configuration device 230 may then receive and store configuration information, based on the archive configuration information.

Figure 5E:
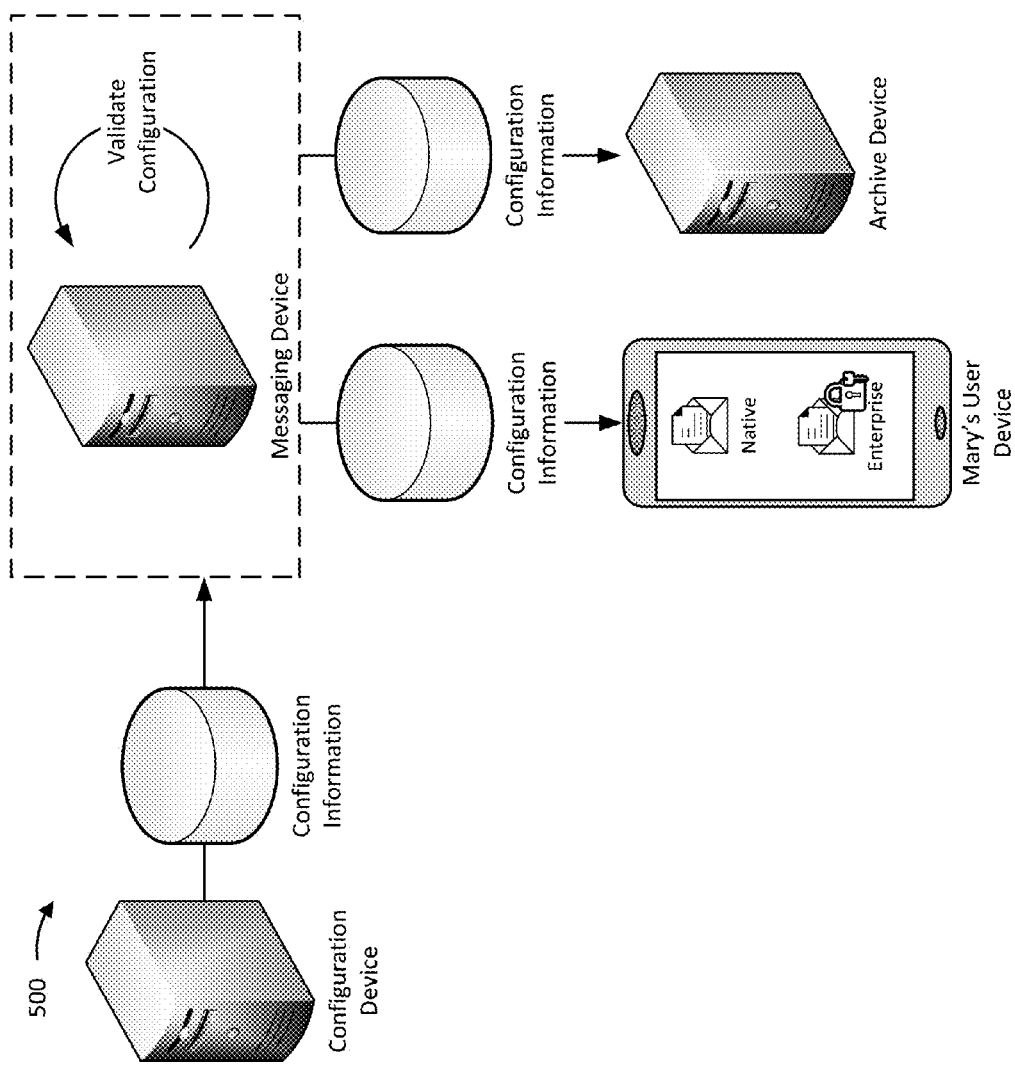

As shown in FIG. 5E, assume, for example implementation 500, that messaging device 220 receives the configuration information from configuration device 230, validates the configuration information, and sends at least a portion of the configuration information to user device 210 and/or archive device 240, For example, messaging device 220 may receive configuration information from configuration device 230. Messaging device 220 may validate the configuration information and/or the identity of configuration device 230, then send some or all of the validated configuration information to an enterprise messaging application running on, e.g., Mary's user device 210 and/or to archive device 240.

Figure 5F:
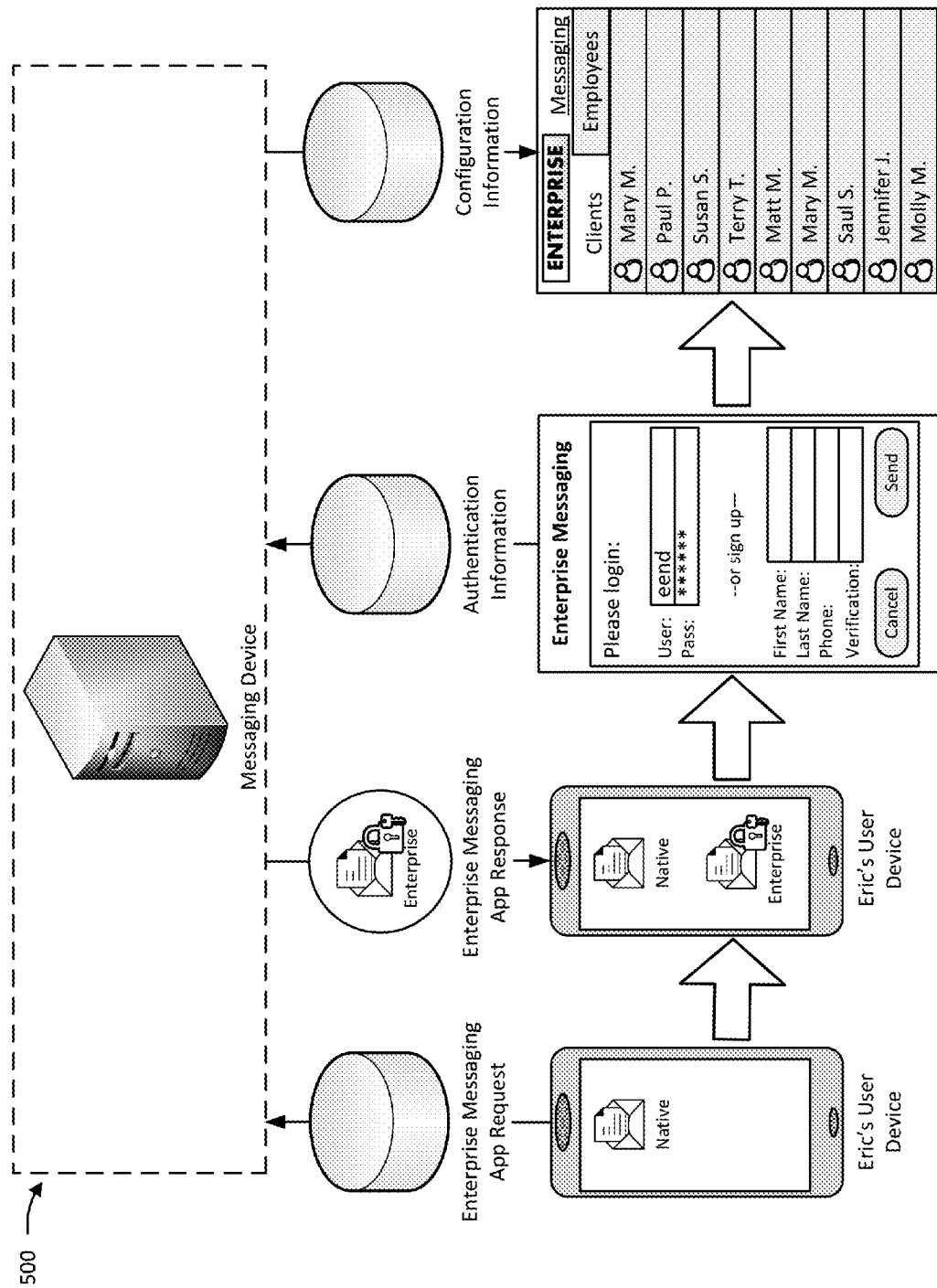

As shown in FIG. 5F, assume, for example implementation 500, that messaging device 220 receives, from user device 210, an enterprise messaging request and responds to the enterprise messaging application request by sending an enterprise messaging application to user device 210. Assume further that messaging device 220 sends configuration information, based on authentication information received from the enterprise messaging application, to user device 210. For example, messaging device 220 may receive from, e.g., Eric's user device 210, an enterprise messaging application request. Based on the enterprise messaging application request, messaging device 220 may send, to Eric's user device 210, an enterprise messaging application response including an enterprise messaging application. Messaging device 220 may further receive, from the enterprise messaging application sent to, and running on, Eric's user device 210, authentication information (e.g., Eric's username, password, and/or other credentials). Based on the authentication information, messaging device 220 may send, to the enterprise messaging application running on Eric's user device 210, configuration information associated with Eric's enterprise messaging application (e.g., look-and-feel configuration information, directory configuration information, etc.).

As indicated above, FIGS. 5A-5F are provided merely as an example. Other examples are possible and may differ from what was described with regard to FIGS. 5A-5F. For example, while the configuration information has been described as being based on user input, the configuration information may also be obtained without user input (e.g., the configuration information could be retrieved from memory of configuration device 230 and/or received from another device).

Figure 6:
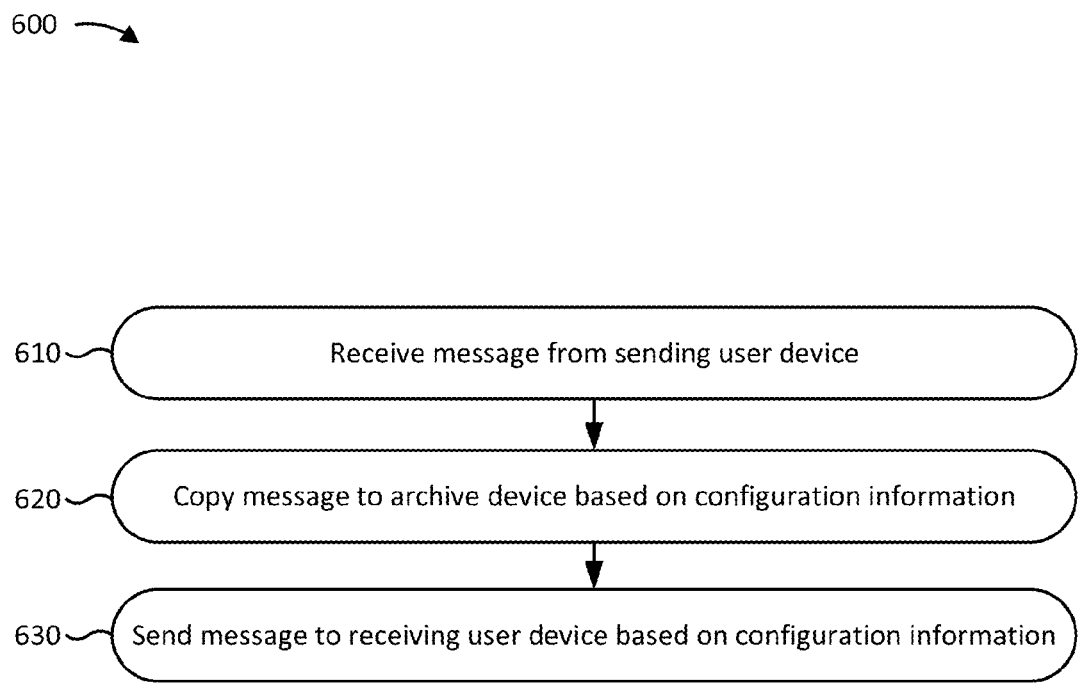
FIG. 6 is a flowchart of an example process for using an enterprise messaging and archive system.

FIG. 6 is a flowchart of an example process 600 for using an enterprise messaging and archive system. In some implementations, one or more process blocks of FIG. 6 may be performed by messaging device 220. Additionally, or alternatively, one or more process blocks of FIG. 6 may be performed by another device or a group of devices separate from or including messaging device 220, such as user device 210, configuration device 230, and/or archive device 240.

As shown in FIG. 6, process 600 may include receiving a message from a sending user device (block 610). For example, messaging device 220 may receive from, e.g., user device 210 via network 250, a message containing message information. Messaging device 220 may receive the message directly from user device 210 and/or messaging device 220 may communicate with another device associated with network 250 to receive the message from user device 210 based on, e.g., a message format (e.g., SMS/MMS messages may be routed differently from packet messages) and/or. The message information may include, e.g., message content, sender information, recipient information, a date/time stamp, additional configuration information, and/or delivery options. Delivery options may include a message expiration, a delivery priority, or a delivery schedule. The message may be encrypted, and the delivery options may specify whether the message is to be delivered in an encrypted form or may be delivered in an unencrypted form.

Messaging device 220 may resolve differences between the message information and previously stored configuration information. For example, messaging device 220 may determine that the previously stored configuration information includes privilege information, associated with a sender/recipient identified in the message information, which prevents messaging device 220 from sending the message to/from the identified sender/recipient. As another example, messaging device 220 may determine, based on the previously stored configuration information, that the message information contains content which prevents messaging device 220 from sending the message to a particular sender/recipient. As yet another example, messaging device 220 may determine that additional configuration information, contained in the message information, conflicts with some or all of the previously stored configuration information, and messaging device 220 may, e.g., based on the privilege information associated with the sender, modify the additional configuration information and/or the previously stored configuration information.

As also shown in FIG. 6, process 600 may include copying the message to an archive device based on configuration information (block 620). Messaging device 220 may determine that the message satisfies a condition for archiving based on, e.g., the received message information and/or based on previously stored configuration information. The condition may be related to a sender, recipient, content, and/or another portion of message information which may direct messaging device 220 to copy the message for archival. For example, messaging device 220 may determine that a sender/recipient username and/or phone number is identified, in, e.g., a list of usernames/phone numbers, in the archive configuration. As another example, messaging device 220 may identify, within the message content, one or more words and/or phrases, identified in, e.g., a list of words and/or phrases, in the archive configuration information.

Messaging device 220 may store the copy of the outgoing message in memory and/or storage accessible by messaging device 220 prior to sending the copy of the message to archive device 240. For example, messaging device 220 may store a certain amount (e.g., based on a number or size) or duration (e.g., based on a schedule) of archive messages prior to sending the archived messages to archive device 240. Sending the copy of the message to archive device 240 may involve authentication with archive device 240 in a manner similar to that described with respect to block 610.

As also shown in FIG. 6, process 600 may include sending the message to a receiving user device based on configuration information (block 630). For example, messaging device 220 may forward the message to, e.g., a receiving user device 210 via network 250, without modification. In some implementations, messaging device 220 may, based on the configuration information, modify the message. For example, using a virtual telephone number, messaging device 220 may convert a message, sent from the sending user device via the enterprise messaging application, from a packet message to an SMS, prior to sending the message to the receiving user device. Messaging device 220 may add, remove, or replace part of the message information included in or associated with the message. For example, based on privilege information associated with the sending and/or receiving user/user device 210, messaging device 220 may remove or replace inappropriate or sensitive information or add additional relevant information prior to sending the message to the receiving user device. Additionally, or alternatively, messaging device 220 may delay, divert, or decline sending the message (e.g., according to a security, location, format, and/or time condition). For example, messaging device 220 may route the message based on the format (e.g., using a network path for a SMS/MMS different from the network path for a packet message) or delay/decline the sending of the message based on a security restriction (e.g., delay sending a message outside of permitted hours and/or decline to send a message from an unauthorized sender/to an unauthorized recipient).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
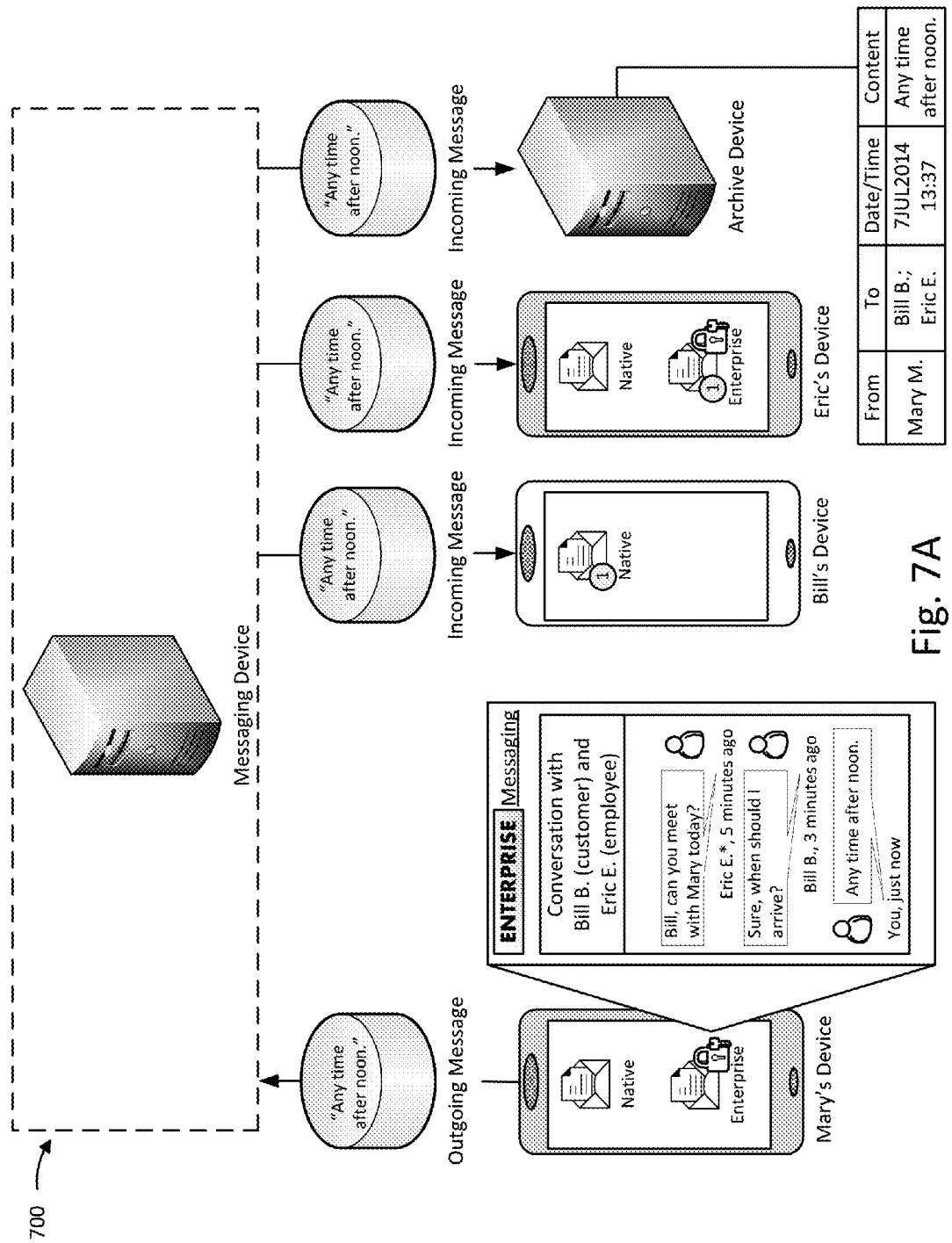
FIGS. 7A and 7B are diagrams of an example implementation relating to the example process of FIG. 6.
Figure 7B:
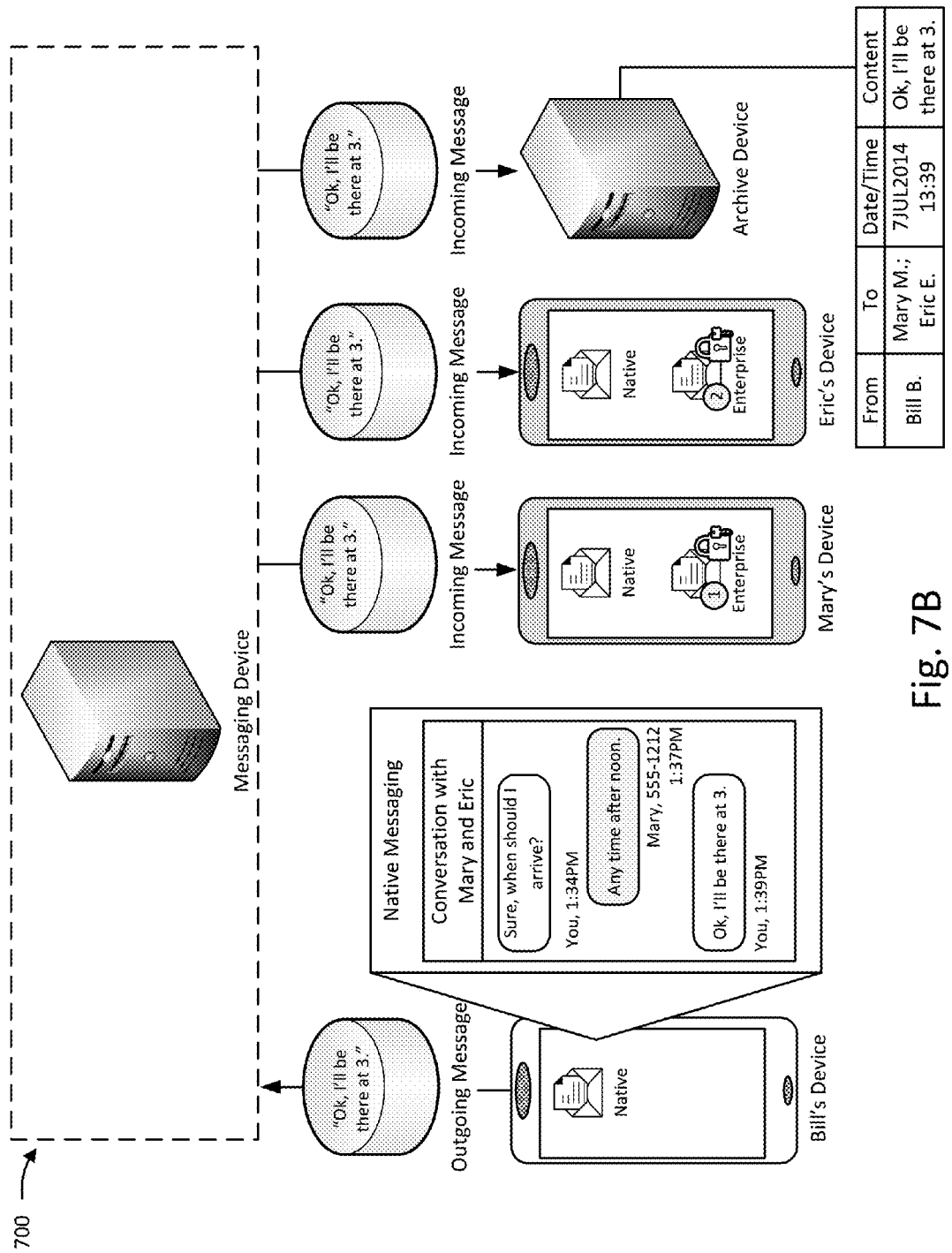

FIGS. 7A and 7B are diagrams of an example implementation relating to the example process of FIG. 6. In example implementation 700, assume that Bill, a customer, is engaged in a group conversation with Eric and Mary, employees of an enterprise, using the native messaging application running on Bill's user device (e.g., user device 210) and the enterprise messaging application running on each of Eric and Mary's user devices (e.g., user device 210). Assume further that the native messaging application communicates using SMS/MMS format, and the enterprise messaging application communicates using a packet message format. Assume still further that archive configuration information stored by a messaging device (e.g., messaging device 220) directs the messaging device to copy all messages sent to and/or from Eric and/or Mary to an archive device (e.g., archive device 240).

As shown in FIG. 7A, assume, for example implementation 700, that Mary sends, from the enterprise messaging application running on Mary's user device, a packet message containing an outgoing message, to the messaging device. The outgoing message may include message information, including a sender identifier (e.g., Mary), a recipient identifier (e.g., Bill and Eric), a date/time stamp (e.g., 13:37, 7 Jul. 2014), and content "Any time after noon."). The messaging device may receive the outgoing message and send, based on the configuration information, an SMS/MMS, containing the message information, to Bill's user device, and a packet message, containing the message information, to Eric's user device. The messaging device may also, based on determining that Mary is a sender of the message, send the message information to the archive device for archiving.

As shown in FIG. 7B, assume, for example implementation 700, that Bill responds to Mary's message by sending, from the native messaging application running on Bill's user device, an SMS/MMS containing an outgoing message, to the messaging device. The outgoing message may include message information, including a sender identifier (e.g., Bill's phone number), a recipient identifier (e.g., Mary and Eric's virtual phone numbers), a date/time stamp (e.g., 13:39, 7 Jul. 2014), and content (e.g., "Ok, I'll be there at 3."). The messaging device may receive the outgoing message and send, based on the configuration information, a packet message, containing the message information, to each of Mary and Bill's user devices. The messaging device may also, based on determining that Mary and/or Bill is a recipient of the message, send the message information to the archive device for archiving.

As indicated above, FIGS. 7A and 7B are provided merely as an example. Other examples are possible and may differ from what was described with regard to FIGS. 7A and 7B.

Figure 8:
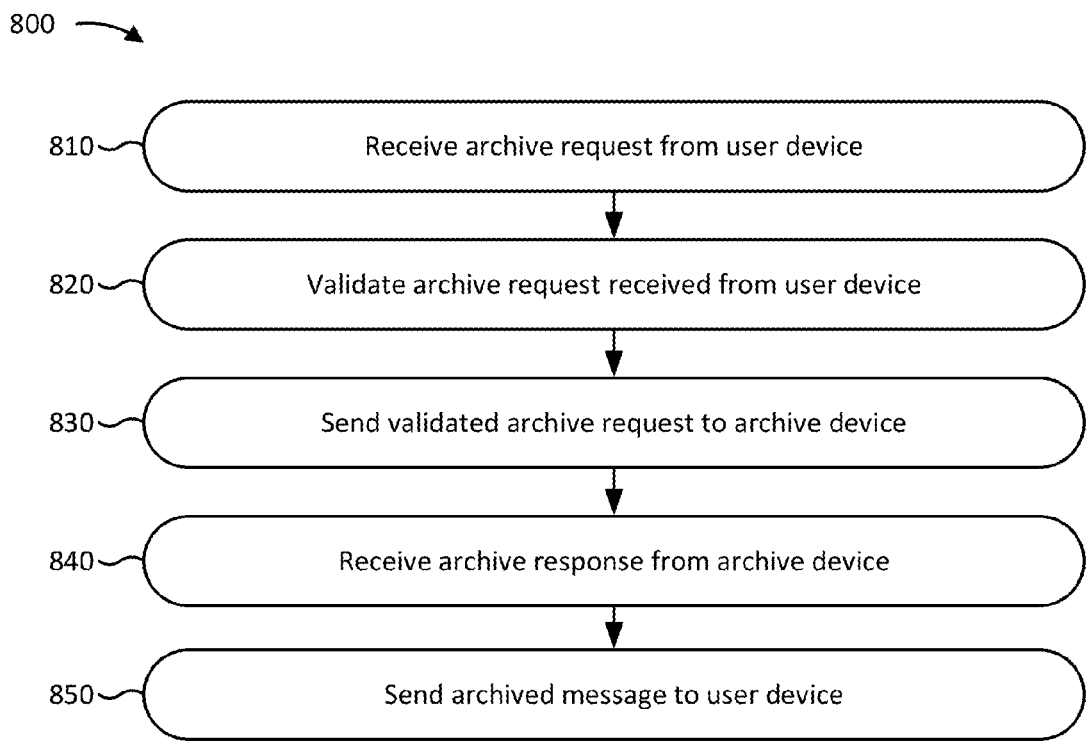
FIG. 8 is a flowchart of an example process for using an enterprise messaging and archive system.

FIG. 8 is a flowchart of an example process 800 for using an enterprise messaging and archive system. In some implementations, one or more process blocks of FIG. 8 may be performed by messaging device 220. Additionally, or alternatively, one or more process blocks of FIG. 8 may be performed by another device or a group of devices separate from or including messaging device 220, such as user device 210, configuration device 230, or archive device 240.

As shown in FIG. 8, process 800 may include receiving an archive request from a user device (block 810). The archive request, sent by the user device (e.g., user device 210) may include various message criteria (e.g., a sender, recipient, time period, and/or content) for fulfilling the archive request. The archive request may also contain authentication information for permitting access to archived messages.

As also shown in FIG. 8, process 800 may include validating the archive request received from the user device (block 820). Messaging device 220 may validate the identity of a user and/or device sending the archive request. For example, messaging device 220 may determine, based on user credentials received with the archive request, that the user has sufficient privileges to access the requested information (e.g., some policies may require "supervisor" or "administrator" credentials). As another example, messaging device 220 may determine that the archive request is signed with a digital security certificate from a trusted authority. Alternatively, or additionally, messaging device 220 may validate whether a user or user device is associated with an enterprise by, e.g., consulting records of ownership and/or consent (e.g., to determine that the requested information belongs to an enterprise sending the archive request).

As also shown in FIG. 8, process 800 may include sending the validated archive request to an archive device (block 830). Based on validating the archive request, messaging device 220 may create a validated archive request. Messaging device 220 may then send, using archive configuration information stored by messaging device 220, the validated archive request to archive device 240. Sending the validated archive request may involve authentication with archive device 240 in a manner similar to the validation described with respect to block 820.

As also shown in FIG. 8, process 800 may include receiving an archive response from the archive device (block 840). For example, archive device 240 may send, in the archive response, archived messages (or a list of archived messages) that match the message criteria included in the archive request.

As also shown in FIG. 8, process 800 may include sending an archived message to the user device (block 850). The archived message, sent by messaging device 220 to user device 210, may include some or all of the archive response received from archive device 240. As a result, a user of user device 210 may access the requested archived messages.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
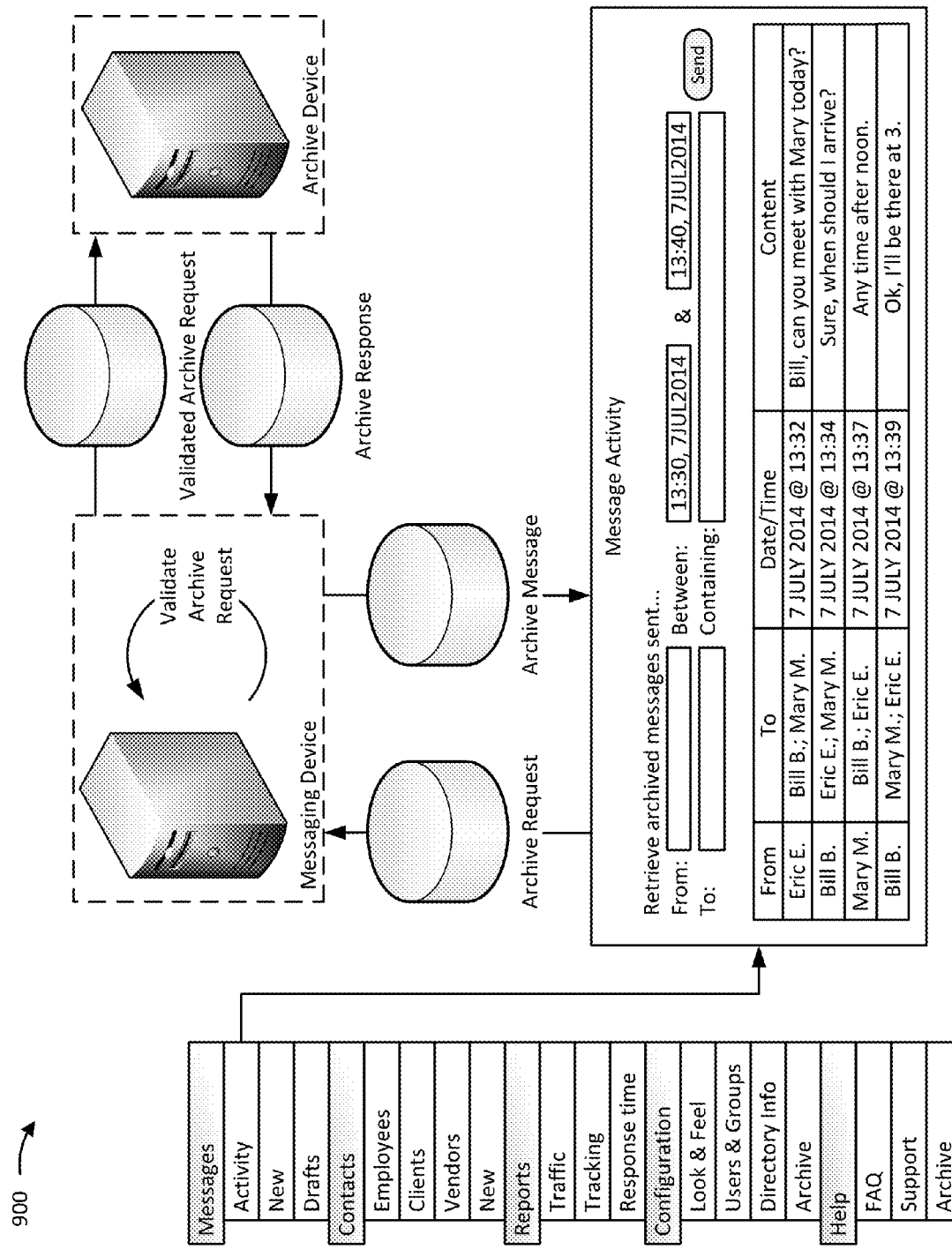
FIG. 9 is a diagram of an example implementation relating to the example process of FIG. 8.

FIG. 9 is a diagram of an example implementation 900 relating to the example process of FIG. 8. In example implementation 900, assume that a user wishes to retrieve archived messages sent between 13:30 and 13:40 on 7 Jul. 2014. Assume further that the archive request is valid. Assume still further that the messages archived during that time range include those shown and described with respect to example 700 in FIGS. 7A and 7B.

As shown in FIG. 9, assume, for example implementation 900, that a user provides input, via, e.g., an enterprise portal and/or enterprise messaging application running on a user device, which is used to generate an archive request. The archive request may contain message criteria relating to time (e.g., messages sent between 13:30 and 13:40 on 7 Jul. 2014), sender, recipient, or message content. The user device may send the archive request to a messaging device. After determining that the archive request is valid, the messaging device may send a validated archive request to an archive device and receive an archive response, from the archive device, based on the validated archive request. The messaging device may send, based on the archive request and the archive response, one or more archive messages to the user device. The user device may then display, via, e.g., the enterprise portal and/or enterprise messaging application, the one or more archive messages received from the messaging device.

As indicated above, FIG. 9 is provided merely as an example. Other examples are possible and may differ from what was described with regard to FIG. 9.

Implementations described herein may assist an enterprise in messaging using an enterprise messaging application as well as archiving messages associated with the enterprise.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt in" or "opt-out" processes as may be appropriate for the situation and type of information. Storage and use of personal information be in an appropriately secure manner reflective of the type of information, for example, through various encryption and anonymization techniques for particularly sensitive information.

It will be apparent that example aspects, as described above, may be implemented in many different forms of firmware, hardware, and a combination of hardware and software in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive configuration information;
identify application configuration information, included within the configuration information, associated with a first user device;
send the application configuration information to the first user device for configuring a messaging application on the first user device;
receive an incoming message, including message information, from the messaging application on the first user device;
identify, based on the message information and the configuration information, a second user device;
identify, based on the message information and the configuration information, a message format associated with the second user device;
send, in the message format associated with the second user device, an outgoing message, based on the message information and the configuration information, to the second user device;
memory to:
store the configuration information; and
store the incoming message.

2. The device of claim 1, where the one or more processors are further to:
identify archive configuration information included within the configuration information;
determine that the device has permission to implement a condition for archiving based on the archive configuration information;
determine, based on the message information and the archive configuration information, that the incoming message meets the condition for archiving; and
send, based on determining that the device has permission to implement the condition for archiving and that the incoming message meets the condition for archiving, a copy of the incoming message to an archive device.

3. The device of claim 1, where the one or more processors are further to:
receive an archive request from the first user device;
validate the archive request received from the first user device;
send the validated archive request to an archive device;
receive an archive response, based on the validated archive request, from the archive device; and
send an archived message, based on the archive response received from the archive device, to the first user device.

4. The device of claim 1, where the application configuration information, associated with the first user device, comprises:
look and feel configuration information, including layout, font, color, or image information, for configuring the messaging application on the first user device;
user and group configuration, including user profile information, user privilege information, or group privilege information, for configuring the messaging application on the first user device; or
directory configuration information, including a contact list, for configuring the messaging application on the first user device.

5. The device of claim 1, where the one or more processors, prior to sending the application configuration information to the first user device, are further to:
receive an application request from the first user device; and
send, based on the application request, the messaging application to the first user device.

6. The device of claim 1, where the one or more processors, when identifying the application configuration information associated with the first user device, are further to:
receive authentication information from the first user device, and
identify, based on the authentication information received from the first user device, the application configuration information associated with the first user device.

7. The device of claim 1, where the one or more processors, when receiving the configuration information, are further to:
receive the configuration information, as input, via a portal.

8. A non-transitory computer-readable medium storing instructions, the instructions comprising: a plurality of instructions that, when executed by a processor of a device, cause the processor to: receive configuration information from a configuration device; validate the configuration information received from the configuration device; receive a configuration request from a first user device; send application configuration information, based on the configuration request and based on the configuration information, to the first user device; receive a first message, in a message format associated with a second user device and including message information, from the second user device; determine, based on the message information and the configuration information, that the first user device is a recipient of the first message; based on determining that the first user device is a recipient of the first message: identify, based on the configuration information, a message format associated with the first user device; and send, in the message format associated with the first user device, a second message, based on the message information and the configuration information, to the first user device.

9. The non-transitory computer-readable medium of claim 8, where: the message format associated with the second user device is a short message service or multimedia message service format; and the message format associated with the first user device is different from the message format associated with the second user device.

10. The non-transitory computer-readable medium of claim 8, where one or more instructions, of the plurality of instructions, when executed by the processor of the device, further cause the processor to: receive a second configuration request from the second user device; and send second application configuration information, based on the second configuration request and based on the configuration information, to the second user device, the message format, associated with the first user device, being a same format as the message format associated with the second user device.

11. The non-transitory computer-readable medium of claim 8, where one or more instructions, of the plurality of instructions, when executed by the processor of the device, further cause the processor to: identify archive configuration information based on the configuration information received from the configuration device; determine, based on the message information and the archive configuration information, that the first message meets a condition for archiving; and create, based on determining that the first message meets the condition for archiving, a copy of the first message for archiving.

12. The non-transitory computer-readable medium of claim 11, where one or more instructions, of the plurality of instructions, when executed by the processor of the device, further cause the processor to: authenticate with archive device; and send the copy of the first message to the archive device to permit the archive device to archive the copy of the first message.

13. The non-transitory computer-readable medium of claim 11, where one or more instructions, of the plurality of instructions, when executed by the processor of the device to determine that the first message meets the condition for archiving, further cause the processor to: determine that a telephone number, associated with the first user device or the second user device, is identified as an archived telephone number.

14. The non-transitory computer-readable medium of claim 8, where one or more instructions, of the plurality of instructions, when executed by the processor of the device, further cause the processor to: identify, based on the configuration information, a virtual telephone number associated with the first user device; and use the virtual telephone number, associated with the first user device, to send the second message to the first user device.

15. A method, comprising:
   receiving, by a device, configuration information associated with the device and associated with a user device;
   receiving, by the device, a request, from the user device, for the configuration information associated with the user device;
   sending, by the device and based on the request, the configuration information associated with the user device, to the user device;
   receiving, by the device from the user device, a message indicating a recipient identified in the configuration information associated with the user device;
   sending, by the device, the message to the recipient indicated in the message;
   determining, by the device and based on the configuration information and based on the message, whether the message meets a condition for archiving; and
   selectively sending, by the device, the message for archiving, based on whether the message meets the condition for archiving.

16. The method of claim 15, where the configuration information associated with the user device comprises:
   user profile and directory information to configure a messaging application running on the user device; and
   where the recipient is identified in the directory information.

17. The method of claim 15, where receiving the configuration information further comprises:
   receiving, as input, the configuration information from a customer resource management device which maintains enterprise user information, enterprise messages, or enterprise contact information.

18. The method of claim 15, where receiving the configuration information further comprises:
   receiving, as input, the configuration information via a portal.

19. The method of claim 15, further comprising:
   receiving, with the message the user device, a virtual telephone number associated with the user device; and
   sending, with the message to the recipient, the virtual telephone number associated with the user device.

20. The method of claim 15, where determining whether the message meets the condition for archiving further comprises:
   determining whether a sender identifier or a recipient identifier, associated with the message, meets the condition for archiving, based on the configuration information associated the device; and
   where selectively sending the message for archiving includes:
   sending the message to an archive device based on determining that the message meets the condition for archiving.

* * * * *